United States Patent
Fuchs et al.

(10) Patent No.: US 10,562,477 B2
(45) Date of Patent: Feb. 18, 2020

(54) OPTICAL SENSOR SUPPORTING STRUCTURE FOR SADDLED VEHICLE

(71) Applicant: HONDA MOTOR CO., LTD., Minato-ku, Tokyo (JP)

(72) Inventors: Oliver Fuchs, Offenbach am Main (DE); Joerg Deigmoeller, Offenbach am Main (DE); Herbert Janssen, Offenbach am Main (DE)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/300,981

(22) PCT Filed: Jun. 24, 2016

(86) PCT No.: PCT/JP2016/068839
§ 371 (c)(1),
(2) Date: Nov. 13, 2018

(87) PCT Pub. No.: WO2017/221410
PCT Pub. Date: Dec. 28, 2017

(65) Prior Publication Data
US 2019/0161042 A1    May 30, 2019

(51) Int. Cl.
*B60R 21/013* (2006.01)
*B62J 99/00* (2009.01)
(Continued)

(52) U.S. Cl.
CPC .............. *B60R 21/013* (2013.01); *B60R 1/12* (2013.01); *B60R 11/02* (2013.01); *B62J 99/00* (2013.01);
(Continued)

(58) Field of Classification Search
CPC .... B60R 21/013; B60R 1/12; B62J 2099/002; B62K 2207/00; B62K 19/40; B62K 11/04; G08G 1/167
(Continued)

(56) References Cited

U.S. PATENT DOCUMENTS 8,121,757 B2 * 2/2012 Song .................... B62K 21/08
                                                  280/283
10,166,909 B2 * 1/2019 Suzuki ................. B60Q 1/0023
(Continued)

FOREIGN PATENT DOCUMENTS

| JP | 2001-158390 | 6/2001 |
| JP | 2007-112368 | 5/2007 |
| JP | 2009-023543 | 2/2009 |

OTHER PUBLICATIONS

International Search Report and Written Opinion for International Application No. PCT/JP2016/068839 dated Aug. 30, 2016, 7 pgs.

*Primary Examiner* — John A Tweel, Jr.
(74) *Attorney, Agent, or Firm* — Amin, Turocy & Watson, LLP

(57) ABSTRACT

The present invention provides an optical sensor supporting structure for a saddled vehicle capable of accurately detecting a front of the vehicle by an optical sensor without affecting usability of accessories at a front portion of the vehicle. The optical sensor supporting structure for a saddled vehicle includes left and right cameras which are configured to detect an object in front of the vehicle, and a support stay which is fixed to a head pipe of a vehicle body frame and supports accessories at the front of the vehicle on the head pipe, wherein the left and right cameras are supported by the support stay.

7 Claims, 9 Drawing Sheets

(51) Int. Cl.
*B60R 11/02* (2006.01)
*B62K 11/04* (2006.01)
*B62K 19/40* (2006.01)
*B60R 1/12* (2006.01)
*G08G 1/16* (2006.01)

(52) U.S. Cl.
CPC .............. *B62K 11/04* (2013.01); *B62K 19/40* (2013.01); *G08G 1/167* (2013.01); *B62J 2099/002* (2013.01)

(58) Field of Classification Search
USPC ........................................................ 340/933
See application file for complete search history.

(56) References Cited

U.S. PATENT DOCUMENTS

2009/0021582 A1* 1/2009 Nakaya ..................... B60R 1/00
  348/148
2017/0327177 A1* 11/2017 Mizuno ................... B62J 99/00

* cited by examiner

OPTICAL SENSOR SUPPORTING STRUCTURE FOR SADDLED VEHICLE

TECHNICAL FIELD

The present invention relates to an optical sensor supporting structure for a saddled vehicle.

BACKGROUND ART

Conventionally, a structure in which a camera is disposed in inner spaces of side mirrors is known (for example, refer to Patent Document 1). Cameras are disposed in each of left and right mirrors to constitute a stereo camera.

However, in the above-described constitution, when the distance between a vehicle and an object photographed by the camera is measured, it is desirable to keep a relative arrangement of the left and right cameras constant. However, when the camera is built in the mirrors, the relative position and angle of the left and right cameras are easily shifted due to movement of the mirrors, and it has been difficult to measure the distance to the object to be photographed with high accuracy. Also, when the mirrors are fixed to fix the relative arrangement of the cameras, a passenger cannot adjust the angles of the mirrors, and the usability of the mirrors deteriorates.

RELATED ART DOCUMENT

Patent Document

Patent Document 1: Japanese Unexamined Patent Application, First Publication No. 2009-23543

SUMMARY

Problems to be Solved by the Invention

Therefore, an object of the present invention is to provide an optical sensor supporting structure for a saddled vehicle capable of accurately detecting a front of a vehicle by an optical sensor without affecting usability of accessories at the front of the vehicle.

Means for Solving the Problem

As means for solving the above problem, according to the present invention, there is provided an optical sensor supporting structure for a saddled vehicle including a pair of left and right optical sensors (41) which are configured to detect an object in front of the vehicle, and a support stay (35) which is fixed to a head pipe (6) of a vehicle body frame (5) and supports accessories at the front of the vehicle on the head pipe (6), wherein the pair of left and right optical sensors (41) are supported by the support stay (35).

Further, the saddled vehicles include any vehicle in which a driver straddles a vehicle body when riding it and include not only motorcycles (including bicycles with prime movers and a scooter type vehicles), but also three-wheeled (including two-front-wheel and one-rear-wheel vehicles in addition to one-front-wheel and two-rear-wheel vehicles) or four-wheeled vehicles.

According to such a constitution, since the left and right optical sensors are supported by the support stay having high rigidity, it is possible to minimize shifting of a relative position of the left and right optical sensors, as compared with a constitution in which the left and right optical sensors are disposed on rearview mirrors or the like. Therefore, it is possible to accurately detect a distance between an object in front of the vehicle and the vehicle. In addition, it is possible to ensure usability of accessories without affecting movement of the accessories such as the rearview mirrors.

The optical sensor supporting structure for a saddled vehicle may further include a pair of left and right front forks (3) which pivotally support a front wheel (2), and the pair of left and right optical sensors (41) may be disposed on an outer side of the pair of left and right front forks (3) in a width direction of the vehicle in a front view.

In this case, it is possible to sufficiently ensure the distance between the left and right optical sensors in the width direction of the vehicle with the left and right front forks interposed therebetween and to accurately measure the distance between the object in front of the vehicle and the vehicle.

The optical sensor supporting structure for a saddled vehicle may further include a pair of left and right front forks (3) which pivotally support a front wheel (2), and a bridge member (4b) which connects a space between the pair of left and right front forks (3), and the pair of left and right optical sensors (41) may be disposed above the bridge member (4b).

In this case, the bridge member can minimize external disturbance from the lower side to the left and right optical sensors. Further, when the position of the left and right optical sensors is low, a proportion occupied by a road surface in a detection range increases, but a proportion occupied by a space above the road surface in the detection range is increased by setting the position of the left and right optical sensors to be high, and thus the detection accuracy in front of the vehicle can be enhanced. Also, when the position of the left and right optical sensors is high, a large distance between the left and right optical sensors and the road surface can be secured, and it is possible to detect road surface conditions with higher accuracy.

In the optical sensor supporting structure for a saddled vehicle, the support stay (35) may include a rail portion (38, 138) which fixes the pair of left and right optical sensors (41) with a width direction of the vehicle being a lengthwise direction.

In this case, the degree of freedom of arrangement of the left and right optical sensors in the width direction of the vehicle can be increased. Further, since the left and right optical sensors are supported by the rail portion extending in the width direction of the vehicle, it is easy to set the fixing position and angle of the left and right optical sensors symmetrically, and thus the left and right optical sensors can be easily mounted.

In the optical sensor supporting structure for a saddled vehicle, the pair of left and right optical sensors (41) may be rigidly mounted on the support stay (35).

In this case, it is easy to keep the left and right optical sensors at a prescribed fixing position and angle and to accurately measure the distance to the object in front of the vehicle and so on, as compared with a case in which the left and right optical sensors are rubber-mounted.

The optical sensor supporting structure for a saddled vehicle may further include a meter unit (31) which is supported by the support stay (35), and a front cowl (21) which covers a front of the meter unit (31), and the pair of left and right optical sensors (41) may be disposed in a space (K1) surrounded by the meter unit (31) and the front cowl (21).

In this case, it is possible to effectively utilize the space between the meter unit and the front cowl as an arrangement space of the left and right optical sensors and to minimize enlargement of the front cowl. In addition, the left and right optical sensors can be disposed to be inconspicuous from the outer side of the vehicle and the passenger side.

Advantage of the Invention

According to the present invention, it is possible to provide an optical sensor supporting structure for a saddled vehicle capable of accurately detecting the front of the vehicle by an optical sensor without affecting usability of accessories at the front of the vehicle.

DESCRIPTION OF THE EMBODIMENTS

Figure 1:
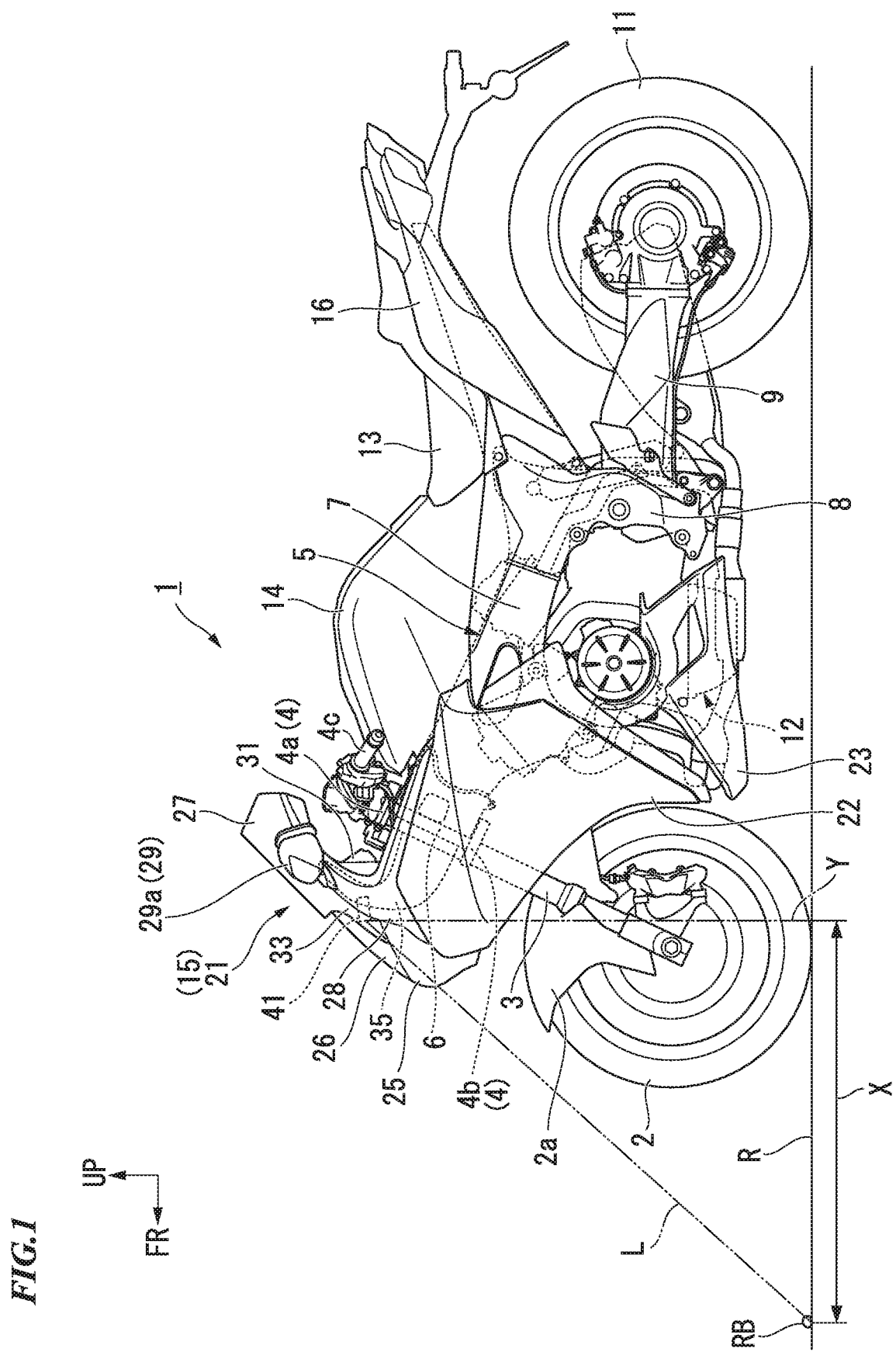
FIG. 1 is a left side view of a motorcycle according to a first embodiment of the present invention.

Hereinafter, embodiments of the present invention will be described with reference to the drawings. In the following description, the directions such as forward, rearward, left and right are the same as those in a vehicle which will be described below unless otherwise noted. Also, in the drawings used for the following description, an arrow FR indicating a forward direction with respect to the vehicle, an arrow LH indicating a leftward direction with respect to the vehicle, an arrow UP indicating an upward direction with respect to the vehicle, a line CL indicating the lateral center of the vehicle, and a line R indicating the road surface are shown at appropriate positions.

First Embodiment

Figure 2:
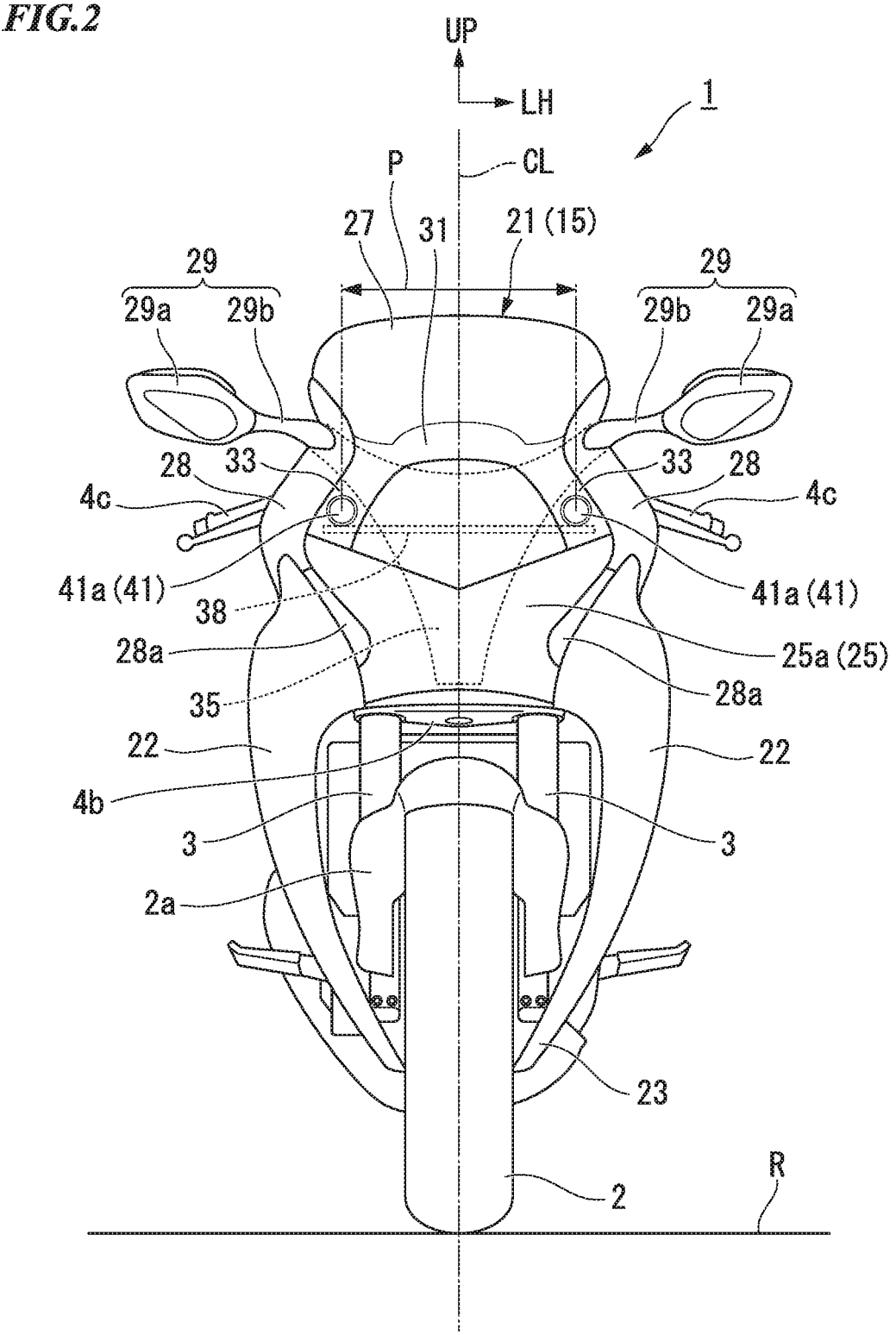
FIG. 2 is a front view of the motorcycle.

In a motorcycle 1 shown in FIGS. 1 and 2, a front wheel 2 thereof is pivotally supported at lower ends of a pair of left and right front forks 3. An upper portion of the front wheel 2 is covered with a front fender 2a. Upper portions of the left and right front forks 3 are pivotally supported by a head pipe 6 at a front end of a vehicle body frame 5 via a steering stem 4 to be steerable. A bar type steering handle 4c is mounted on a top bridge 4a of the steering stem 4. A reference numeral 4b in the drawing indicates a bottom bridge of the steering stem 4.

The vehicle body frame 5 is formed, for example, by integrally joining a plurality of types of aluminum alloy members by welding or the like. Left and right main tubes 7 extend obliquely downward and rearward on the rear side of the head pipe 6. Rear ends of the left and right main tubes 7 are respectively connected to upper ends of left and right pivot frames 8. A front end of a swing arm 9 is swingably supported by the left and right pivot frames 8. A rear wheel 11 is pivotally supported at a rear end of the swing arm 9. An engine 12 which is a prime mover of the motorcycle 1 is mounted inside the vehicle body frame 5.

In the drawing, a reference numeral 13 indicates a seat on which a driver sits, a reference numeral 14 indicates a fuel tank disposed in front of the seat 13, a reference numeral 15 indicates a front cowl assembly covering a front portion of a vehicle body, and a reference numeral 16 indicates a rear cowl which covers a rear portion of the vehicle body.

The front cowl assembly 15 includes an upper cowl portion 21 which covers a front upper portion of the vehicle body frame 5 from the front side to the left and right sides, left and right side cowl portions 22 which are continuous to both the left and right sides of the upper cowl portion 21 and cover the left and right sides of the vehicle body frame 5, and an under cowl portion 23 which is continuous to the lower side of the left and right side cowl portions 22 and covers a lower portion of the engine 12.

A headlight 25 is disposed at a front end of the upper cowl portion 21. The upper cowl portion 21 includes an upper center cowl 26 which covers the upper side of the headlight 25, a wind screen 27 which extends to the upper side of the upper center cowl 26, and left and right upper side cowls 28 which extend upward along left and right side portions of the upper center cowl 26 and the wind screen 27 above the left and right side cowl portions 22. An opening portion 28a of an intake duct of the engine 12 opens toward the front of the vehicle between the headlight 25 and the left and right side cowl portions 21 below the left and right upper side cowls 28.

Mounting seats for left and right rearview mirrors 29 are formed on upper portions of the left and right upper side cowls 28. Each of the left and right rearview mirrors 29 includes a casing 29a which holds a mirror body, and a mirror stay 29b which supports the casing 29a. Base ends of the left and right mirror stays 29b pass through the mounting seats for the left and right upper side cowl 28 and are fastened and fixed to a support stay 35 disposed inside the upper cowl portion 21.

The left and right rearview mirrors 29 are capable of adjusting an angle of the casing 29a with respect to the mirror stay 29b. The left and right rearview mirrors 29 may be capable of adjusting an angle of the mirror body with respect to the casing 29a. Each of the left and right rearview mirrors 29 may have a foldable portion on the mirror stay 29b.

Figure 3:
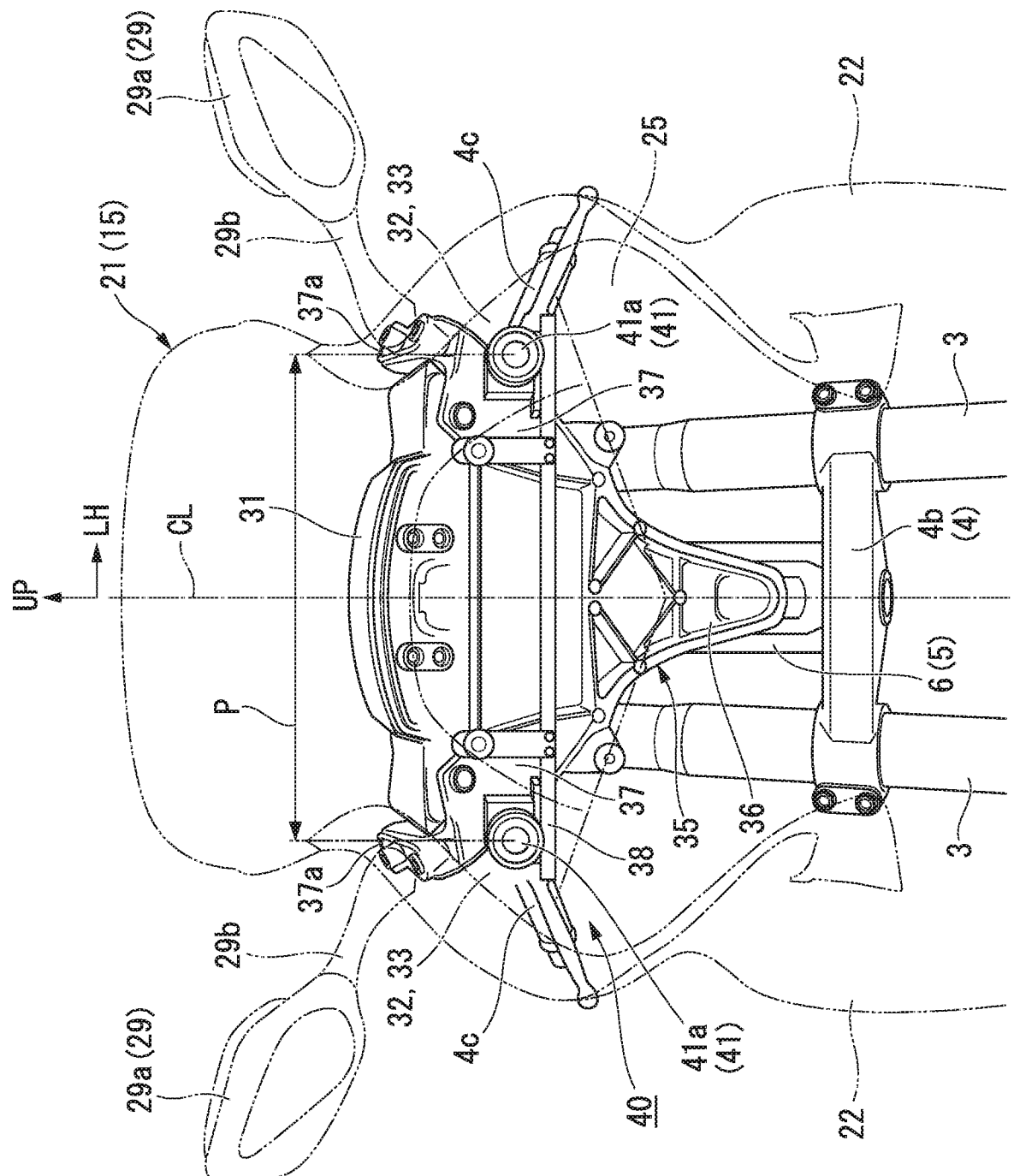
FIG. 3 is an enlarged view of a main part of FIG. 2.
Figure 4:
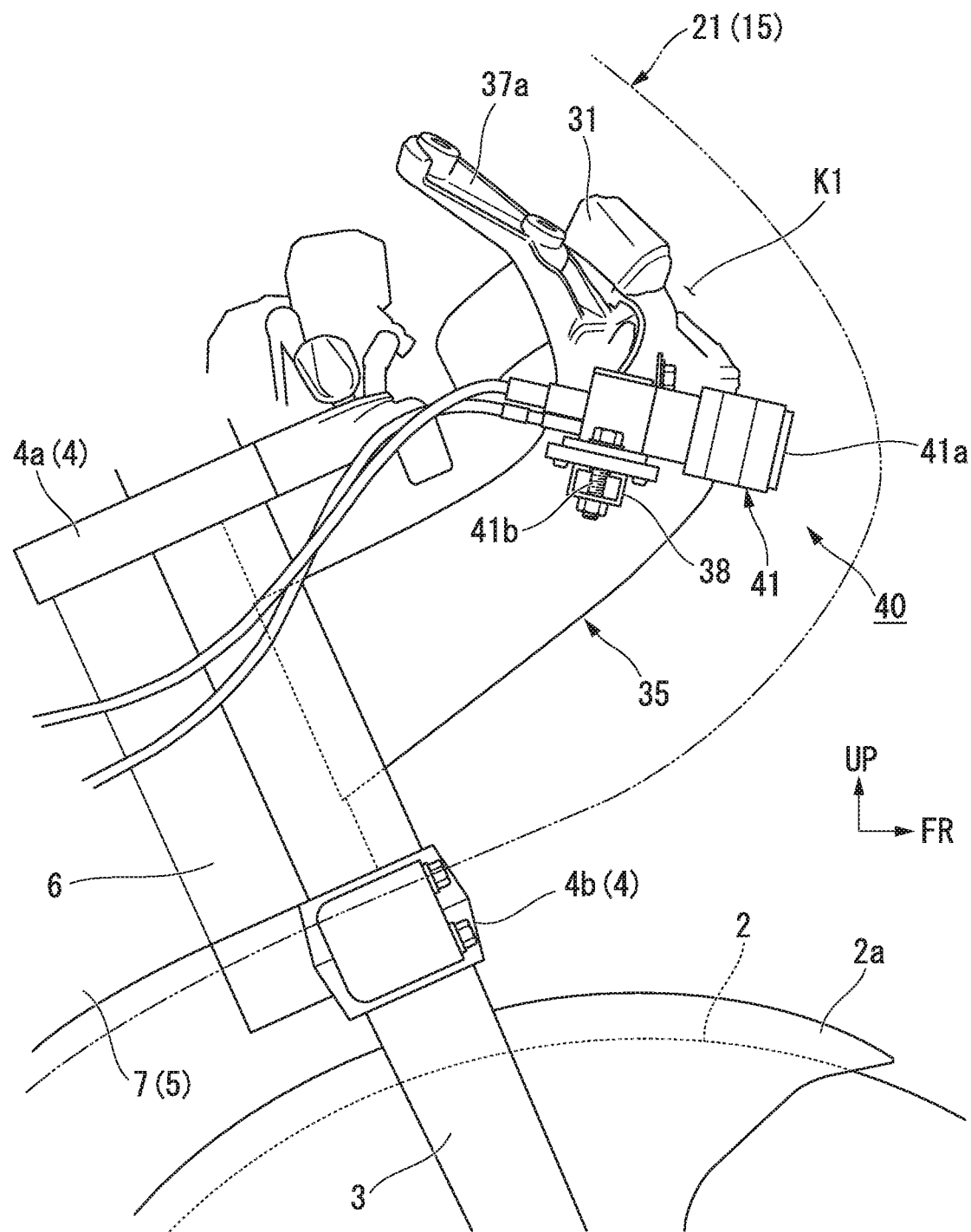
FIG. 4 is a right side view of FIG. 3.

As shown in FIGS. 3 and 4, the support stay 35 is fastened and fixed to the head pipe 6 inside the upper cowl portion 21. The support stay 35 is formed in substantially a Y shape in a front view. The support stay 35 is integrally formed by, for example, resin molding or aluminum die casting. The support stay 35 may have a constitution in which divided bodies are integrally coupled.

The support stay 35 includes a central leg portion 36 of which a lower end portion is fastened and fixed to the head pipe 6, and left and right arm portions 37 which branch and extend to the left and right from an upper end of the central leg portion 36. Mirror fastening portions 37a to which the mirror stays 29b of the left and right rearview mirrors 29 are fastened and fixed are provided at tip ends of the left and right arm portions 37 (left and right ends of the support stay 35).

In addition to the upper cowl portion 21 and the left and right rearview mirrors 29, the headlight 25 and a meter unit 31 are supported by the support stay 35. The meter unit 31 is disposed inside the upper cowl portion 21 so that a display surface thereof faces rearward (toward the passenger side). The support stay 35 has strong rigidity as a frame which supports a plurality of accessories at a front portion of the vehicle.

The motorcycle 1 includes a driving support system 40 using an optical sensor.

The driving support system 40 includes a pair of left and right cameras (optical sensors) 41 provided on the upper cowl portion 21. The left and right cameras 41 constitute a stereo camera which images an object or the like in front of the vehicle from different viewpoints. The driving support system 40 allows the left and right cameras 41 to visually recognize (photograph) the front of the vehicle and to detect an object or the like in front of the vehicle.

The left and right cameras 41 output photographed images to an image processing portion in a control device (not shown) of the driving support system 40. The image processing portion performs recognition of the object or like including other vehicles in front of the motorcycle 1 and calculation of a distance between the object and the motorcycle 1, and so on based on the images captured by the left and right cameras 41.

Referring to FIG. 1, the left and right cameras 41 can detect the object RB (including a flat object such as paint) on the road surface R. In the left and right cameras 41, when an in-vehicle position is low, the vehicle body such as the front wheel 2 and the front fender 2a may enter an angle of view (radiation/incidence angle in the case of an antenna). When the in-vehicle position is high, the left and right cameras 41 can secure a large distance L between the motorcycle 1 (the left and right cameras 41) and the road surface R (the object RB). A reference symbol Y in the drawing indicates a height (a vertical distance) from the road surface R to a center (optical axis center) of an outer surface of a lens 41a of each of the left and right cameras 41, and a reference symbol X in the drawing indicates a horizontal distance from the center of the outer surface of the lens 41a to the object RB.

The image processing portion outputs processing information to a command portion of the control device. The command portion outputs commands to carry out driving support such as brake control and steering control for preventing collision of the motorcycle 1 and various warnings to a passenger to each part of the vehicle. The driving support system 40 may be associated with a navigation system and a cruise control system. The left and right cameras 41 may be used for a drive recorder.

The headlight 25 includes a lens 25a forming a lamp body, and a housing (not shown). In the headlight 25, a front surface (an outer surface or a light emitting surface) of the lens 25a is disposed on an outer surface of the upper cowl portion 21. In the headlight 25, the housing is disposed inside the upper cowl portion 21. The left and right cameras 41 are disposed adjacent to each other on the left and right sides of the housing of the headlight 25 inside the upper cowl portion 21.

The left and right cameras 41 are disposed so that lenses 41a thereof face the front of the vehicle. The lenses 41a of the left and right cameras 41 are disposed above left and right ends of the lens 25a of the headlight 25 in a front view. A reference symbol P in the drawing indicates a distance between centers of outer surfaces of the lenses 41a of the left and right cameras 41. Left and right opening forming portions 32 provided in the upper cowl portion 21 are disposed above the left and right ends of the lens 25a of the headlight 25. The left and right opening forming portions 32 are formed in left and right side portions of the upper center cowl 26 or in the left and right upper side cowls 28.

The left and right opening forming portions 32 expose the lenses 41a of the left and right cameras 41 in the upper cowl portion 21 toward the front of the vehicle through each opening. The left and right cameras 41 are capable of photographing the front of the vehicle through the openings of the left and right opening forming portions 32. Each of the left and right opening forming portions 32 is covered by a transparent opening cover 33 from the front of the vehicle. Left and right opening covers 33 protect the left and right cameras 41 from objects flying in front of the vehicle while allowing the left and right cameras 41 to photograph the front of the vehicle. For example, the left and right opening covers 33 are integrally formed at a lower portion of a wind screen 27.

Figure 5:
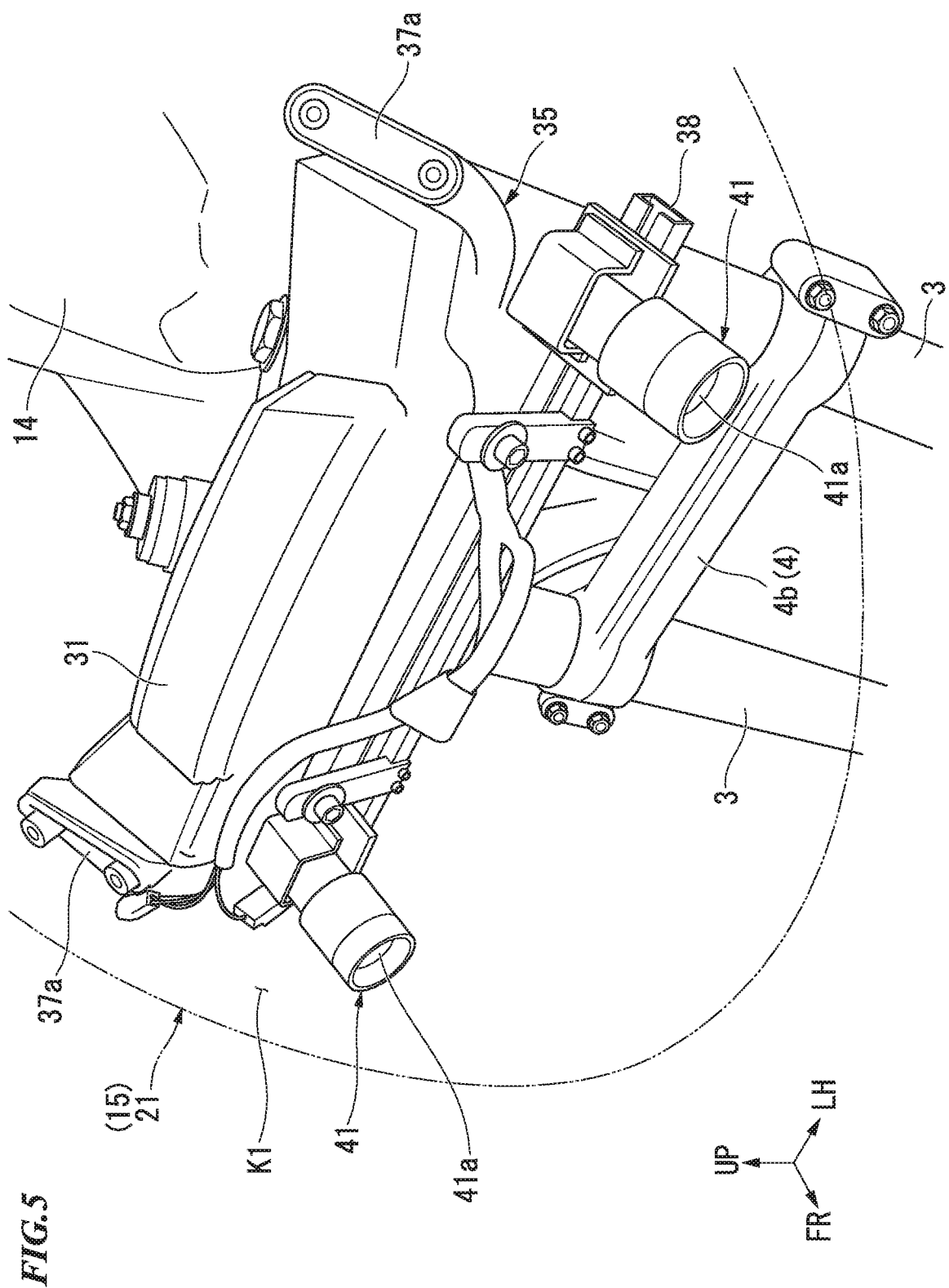
FIG. 5 is a perspective view of FIG. 3.

Also, referring to FIG. 5, the meter unit 31 having various instruments and an information display portion is disposed in the rear of the left and right cameras 41 (on the passenger side) inside the upper cowl portion 21. The left and right cameras 41 are disposed in a space K1 surrounded by the meter unit 31 and the upper cowl portion 21. The left and right cameras 41 are supported by a mount rail 38 extending between the left and right arm portions 37 of the support stay 35. The left and right cameras 41 are disposed symmetrically with respect to the lateral center CL of the vehicle.

The mount rail 38 is provided to extend over an entire lateral width of the support stay 35. The mount rail 38 linearly extends in the left and right direction. A mount screw shaft 41b extending vertically in the left and right cameras 41 is fastened to the mount rail 38. Each of the left and right cameras 41 is fixed to the mount rail 38 via the mount screw shaft 41b. The left and right cameras 41 are rigidly mounted (rigidly fixed without using an elastic member) to the mount rail 38. The mount rail 38 is integrally coupled to the support stay 35. The mount rail 38 may be integrated with the support stay 35. Like the second embodiment which will be described later, for example, the mount rail 38 may be formed of a pipe material extending in the left and right directions, and the left and right cameras 41 may be fixed to the mount rail 38 by a clamping unit (not shown) or the like.

Fixing positions of the left and right cameras 41 with respect to the mount rail 38 in the left and right directions may be capable of being adjusted. Fixing angles of the left and right cameras 41 with respect to the respective mount screw shafts 41b in a plan view may be capable of being adjusted. A mechanism which allows the fixing angle of the left and right cameras 41 in a side view to be adjusted may be provided between the left and right cameras 41 and the mount rail 38.

The left and right cameras 41 are disposed to be located on the left and right outer sides from the left and right front forks 3 as a whole. Each of the left and right cameras 41 may be disposed such that at least a part thereof is located on the outer side in the left and right directions from the left and right front forks 3.

The left and right cameras 41 serve as the stereo camera and improve calculation accuracy of depth information (distance information in forward and rearward directions) of the object at a long distance by widening the distance P between them. In the embodiment, the fixing position and angle of the left and right cameras 41 can be adjusted with respect to the mount rail 38 which generally extends over an entire lateral width of the support stay 35 (additionally, an entire lateral width of the upper cowl portion 21). Therefore, even in a compact vehicle such as a saddled vehicle, as great a distance P between the left and right cameras 41 as possible can be ensured. The accuracy of calculating the distance information of the object can be improved by securing the distance P between the left and right cameras 41.

The left and right cameras 41 are disposed to be located above the bottom bridge 4b as a whole. Each of the left and right cameras 41 is disposed so that at least a part thereof is located above the top bridge 4a. The left and right cameras 41 may be disposed to be located above the top bridge 4a as a whole.

When the position of the left and right cameras 41 is low (close to the road surface R), a proportion occupied by the road surface R in a detection range increases. On the other hand, when the position of the left and right cameras 41 is high, a proportion occupied by a space above the road surface in the detection range increases. In the embodiment, the left and right cameras 41 are disposed at as high a position as possible inside the upper cowl portion 21, and detection accuracy of the object in front of the vehicle is enhanced. When the position of the left and right cameras 41 is high, a large distance L between the left and right cameras 41 and the road surface R can be secured, and detection of road surface conditions can be performed with higher accuracy.

As described above, the optical sensor supporting structure for saddled vehicles according to the first embodiment includes the left and right cameras 41 which are configured to detect the object in front of the vehicle, and the support stay 35 which is fixed to the head pipe 6 of the vehicle body frame 5 to support the accessories at the front of the vehicle on the head pipe 6, and the left and right cameras 41 are supported by the support stay 35.

According to this constitution, since the left and right cameras 41 are supported by the support stay 35 having high rigidity, it is possible to minimize shifting of the relative position of the left and right cameras 41, as compared with a constitution in which the left and right cameras 41 are disposed on the rearview mirrors 29 or the like. Therefore, it is possible to accurately detect the distance between the object in front of the vehicle and the vehicle. In addition, it is possible to ensure usability of the accessories without affecting movement of the accessories such as the rearview mirrors 29.

Vibration applied to the left and right cameras 41 is reduced by the support stay 35 having the high rigidity, and it is possible to maintain the satisfactory detection accuracy in front of the vehicle while minimizing a cost increase without using a high-function (high-priced) camera.

Even in a constitution in which the left and right cameras 41 cooperate to detect an object like a stereo camera, the relative position and angle of the left and right cameras 41 do not easily shift, and the distance to the object in front of the vehicle and so on can be measured with high accuracy.

The optical sensor supporting structure for saddled vehicles in the first embodiment includes the left and right front forks 3 which pivotally support the front wheel 2, and the left and right cameras 41 are disposed on the outer side of the left and right front forks 3 in a width direction of the vehicle in a front view.

According to such a constitution, it is possible to sufficiently ensure the distance P between the left and right cameras 41 in the width direction of the vehicle with the left and right front forks 3 interposed therebetween and to accurately measure the distance between the object in front of the vehicle and the vehicle.

The optical sensor supporting structure for saddled vehicles in the first embodiment includes the bottom bridge 4b which connects a space between the left and right front forks 3, and the left and right cameras 41 are disposed above the bottom bridge 4b.

According to such a constitution, the bottom bridge 4b can minimize external disturbance from the lower side to the left and right cameras 41. Further, the proportion occupied by the space above the road surface in the detection range of the left and right cameras 41 is increased by setting the position of the left and right cameras 41 to be high, and thus the detection accuracy in front of the vehicle can be enhanced. Also, when the position of the left and right cameras 41 is high, a large distance L between the left and right cameras 41 and the road surface R can be secured without changing the angle of view, and the detection of the road surface conditions can be performed with higher accuracy.

In the optical sensor supporting structure for saddled vehicles in the first embodiment, the support stay 35 includes the mount rail 38 which fixes the left and right cameras 41 with the width direction of the vehicle being a lengthwise direction.

According to such a constitution, a degree of freedom of arrangement of the left and right cameras 41 in the width direction of the vehicle can be increased. Further, since the left and right cameras 41 are supported by the mount rail 38 extending in the width direction of the vehicle, it is easy to set the fixing position and angle of the left and right cameras 41 symmetrically, and thus the left and right cameras 41 can be easily mounted.

Since the left and right cameras 41 are independent from the rearview mirrors 29, it is possible to eliminate the influence on visibility of the rearview mirrors 29. The support stay 35 serves to support the rearview mirrors 29, and the mount rail 38 for the left and right cameras 41 can be provided in an elongated manner to extend over the entire lateral width of the support stay 35. Due to the long mount rail 38, the distance P between the left and right cameras 41 can be easily secured.

In the optical sensor supporting structure for saddled vehicles in the first embodiment, the left and right cameras 41 are rigidly mounted on the support stay 35.

According to such a constitution, it is easy to hold the left and right cameras 41 in parallel at a prescribed fixing position and angle and to accurately measure the distance to the object in front of the vehicle and so on, as compared with a case in which the left and right cameras 41 are rubber-mounted.

The optical sensor supporting structure for saddled vehicles in the first embodiment includes the meter unit 31 which is supported by the support stay 35, and the upper cowl portion 21 which covers the front of the meter unit 31, and the left and right cameras 41 are disposed in the space K1 surrounded by the meter unit 31 and the upper cowl portion 21.

According to such a constitution, it is possible to effectively utilize the space K1 between the meter unit 31 and the upper cowl portion 21 as an arrangement space of the left and right cameras 41 and to minimize enlargement of the upper cowl portion 21. In addition, the left and right cameras 41 can be disposed to be inconspicuous from the outer side of the vehicle and the passenger side.

Second Embodiment

Next, a second embodiment of the present invention will be described. The second embodiment is different from the first embodiment in the arrangement of the mount rail and the left and right cameras. In the following description, the same components as those of the first embodiment are designated by the same reference numerals, and a detailed description thereof will be omitted.

Figure 6:
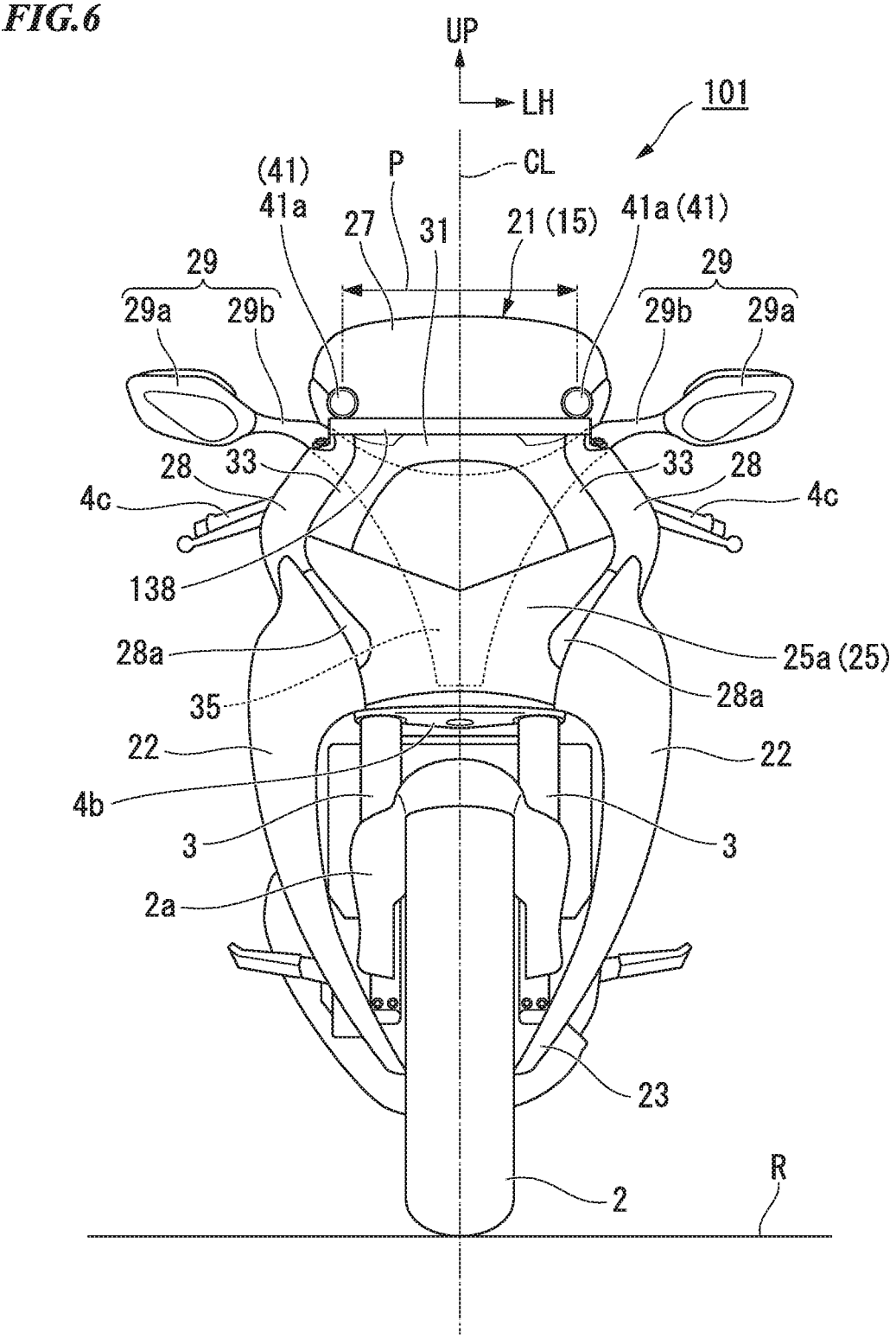
FIG. 6 is a front view of a motorcycle according to a second embodiment of the present invention.
Figure 7:
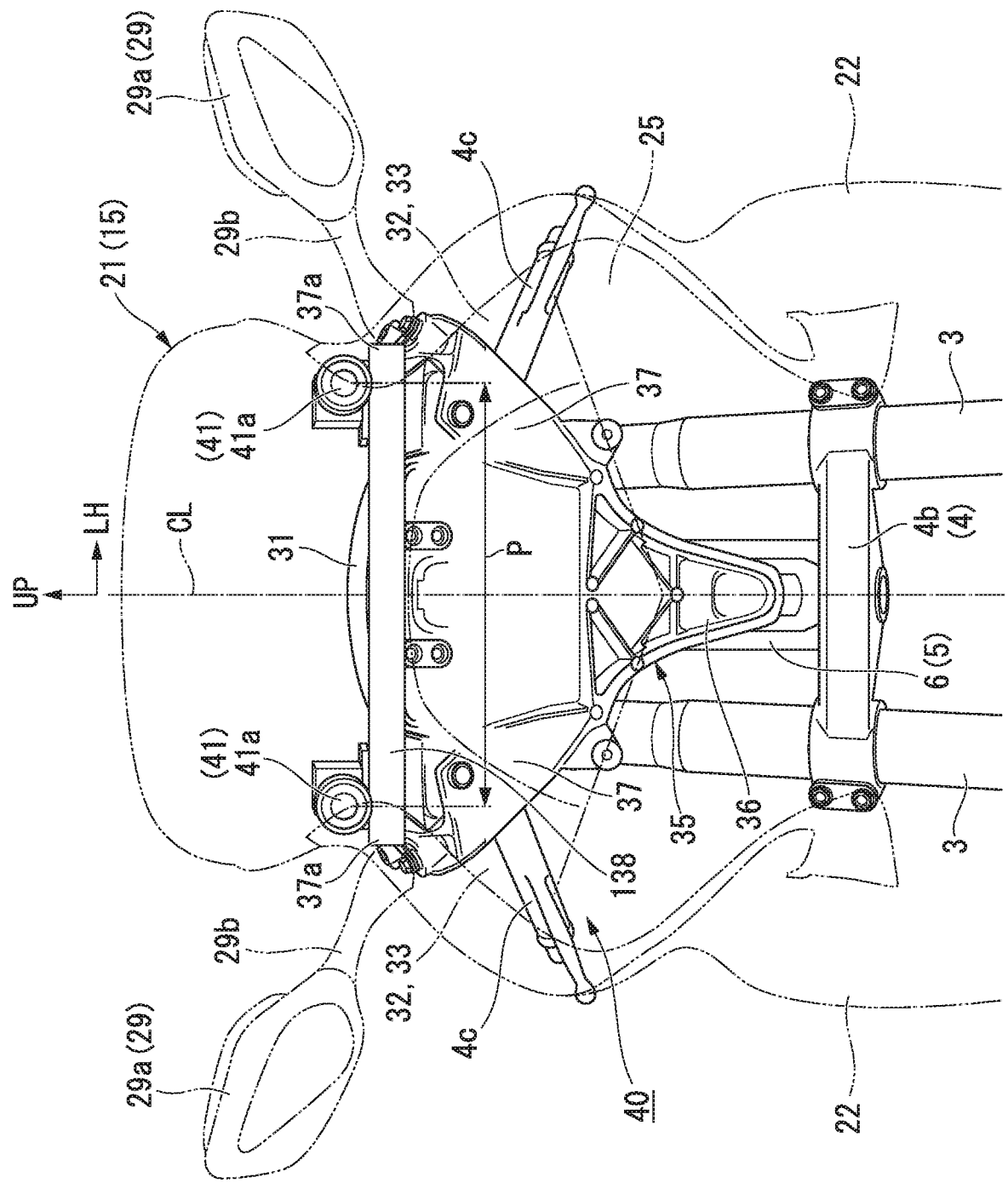
FIG. 7 is an enlarged view of a main part of FIG. 6.
Figure 8:
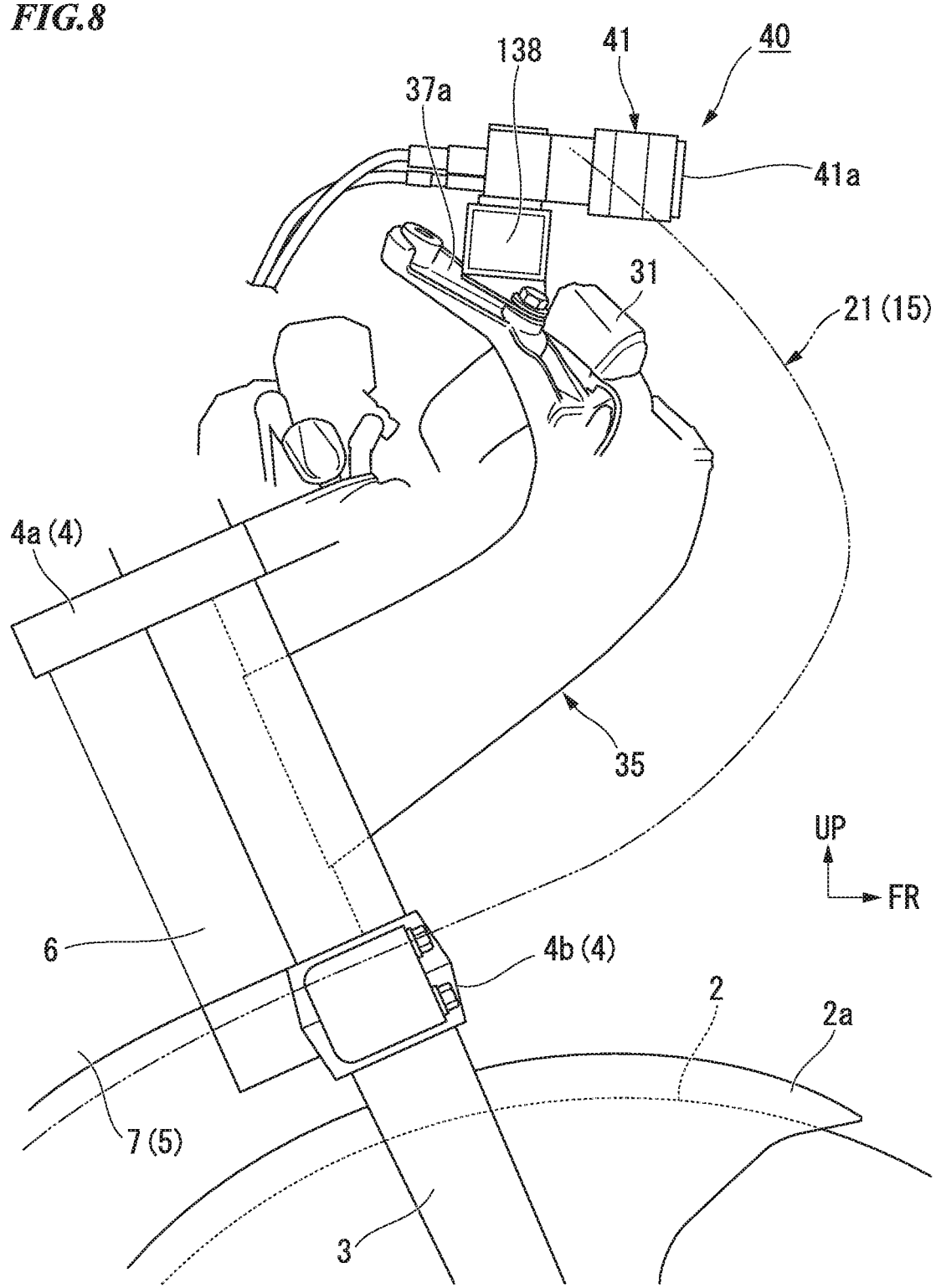
FIG. 8 is a right side view of FIG. 7.
Figure 9:
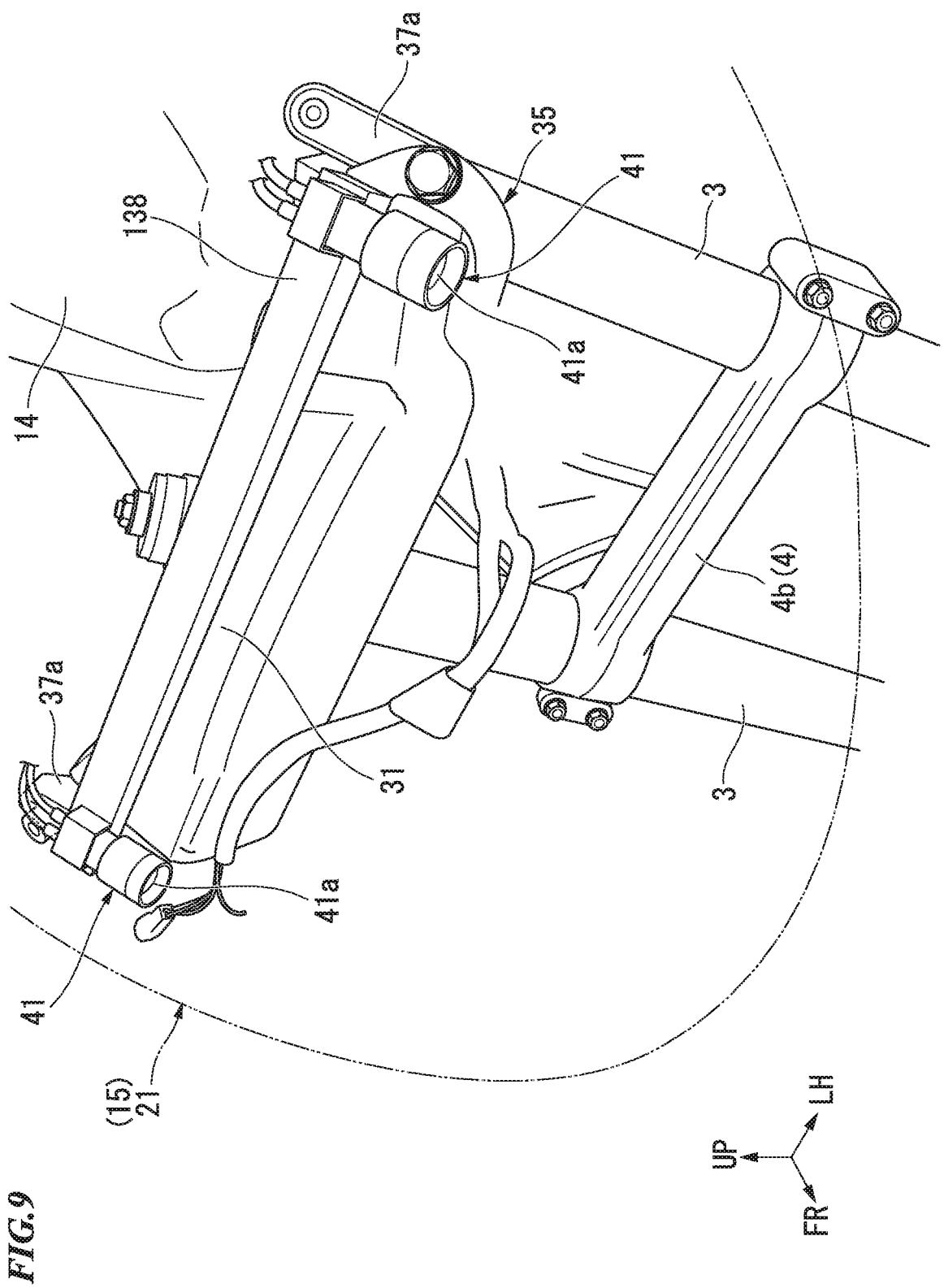
FIG. 9 is a perspective view of FIG. 7.

As shown in FIGS. 6 and 7, in a motorcycle 101 according to the second embodiment, a mount rail 138 and the left and right cameras 41 are disposed outside the upper cowl portion 21. The mount rail 138 is provided across the mounting seat for the left and right rearview mirrors 29 in the upper cowl portion 21. The mount rail 138 is fastened and fixed to left and right mirror fastening portions 37a of the support stay 35 together with base ends of left and right mirror stays 29b.

The mount rail 138 extends linearly in the left and right direction. The mount rail 138 is formed of, for example, a tubular material having a flat four-sided cross section. The mount rail 138 is formed of, for example, a rectangular steel pipe. For example, the mount rail 138 may be formed of other cross-sectional shapes or materials.

The left and right cameras 41 are fixed (rigidly mounted) to the mount rail 138 by a clamping unit (not shown) or the like. For example, the left and right cameras 41 may be fixed to the mount rail 138 via a screw shaft, like in the first embodiment.

The left and right mirror fastening portions 37a are located on the left and right outermost sides of the support stay 35. A length of the mount rail 138 can be easily ensured by fixing the mount rail 138 over the left and right mirror fastening portions 37a, and the distance P between the left and right cameras 41 can be easily secured.

Even when the left and right cameras 41 are disposed outside the upper cowl, it is easy to ensure the distance P between the left and right cameras 41 and also to secure the height Y of the left and right cameras 41. Therefore, it is possible to detect the road surface conditions with higher accuracy.

As described above, also in the optical sensor supporting structure for saddled vehicles in the second embodiment, since the left and right cameras 41 are supported by the support stay 35 having the high rigidity, it is possible to minimize the shifting of the relative position of the left and right cameras 41, as compared with a constitution in which the left and right cameras 41 are disposed on the rearview mirrors 29 or the like. Therefore, it is possible to accurately detect the distance between the object in front of the vehicle and the vehicle. In addition, it is possible to ensure usability of the accessories without affecting the movement of the accessories such as the rearview mirrors 29.

Vibration applied to the left and right cameras 41 is reduced by the support stay 35 having the high rigidity, and it is possible to maintain the satisfactory detection accuracy in front of the vehicle while minimizing the cost increase without using a high-function (high-priced) camera.

Even in a constitution in which the left and right cameras 41 cooperate to detect an object like a stereo camera, the relative position and angle of the left and right cameras 41 are ulikely to shift, and the distance to the object in front of the vehicle and so on can be measured with high accuracy.

Even in the second embodiment, the left and right cameras 41 are disposed on the outer side of the left and right front forks 3 in the width direction of the vehicle in a front view. Therefore, it is possible to sufficiently ensure the distance P between the left and right cameras 41 in the width direction of the vehicle with the left and right front forks 3 interposed therebetween and to accurately measure the distance between the object in front of the vehicle and the vehicle.

Even in the second embodiment, the left and right cameras 41 are disposed above the bottom bridge 4b. Therefore, the bottom bridge 4b can minimize the external disturbance from the lower side to the left and right cameras 41. Further, the proportion occupied by the space above the road surface in the detection range of the left and right cameras 41 is increased by setting the position of the left and right cameras 41 to be high, and thus the detection accuracy in front of the vehicle can be enhanced. Also, when the position of the left and right cameras 41 is high, the distance L between the left and right cameras 41 and the road surface R can be secured large without changing the angle of view, and the detection of the road surface conditions can be performed with higher accuracy.

Even in the second embodiment, the mount rail 138 fixes the left and right cameras 41 with the width direction of the vehicle being a lengthwise direction. Therefore, a degree of freedom of arrangement of the left and right cameras 41 in the width direction of the vehicle can be increased. Further, since the left and right cameras 41 are supported by the mount rail 138 extending in the width direction of the vehicle, it is easy to set the fixing position and angle of the left and right cameras 41 symmetrically, and thus the left and right cameras 41 can be easily mounted.

Since the left and right cameras 41 are independent from the rearview mirrors 29, it is possible to eliminate the influence on the visibility of the rearview mirrors 29. The support stay 35 serves to support the rearview mirrors 29, and the mount rail 138 for the left and right cameras 41 can be provided in an elongated manner to extend over the entire lateral width of the support stay 35. Due to the long mount rail 138, the distance P between the left and right cameras 41 can be easily secured.

Even in the second embodiment, the left and right cameras 41 are rigidly mounted on the support stay 35. Therefore, it is easy to hold the left and right cameras 41 in parallel at a prescribed fixing position and angle and to accurately measure the distance to the object in front of the vehicle and so on, as compared with the case in which the left and right cameras 41 are rubber-mounted.

In addition, since the support stay 35 is disposed at a position which is easily accessible from the outer side, it is easy to divert the mount rail 138 to other vehicles. Therefore, versatility of the mount rail 138 is improved, and a structure with reduced cost can be obtained.

The present invention is not limited to the above-described embodiments, and for example, the camera may be a camera which images invisible light such as infrared rays as well as visible light. It may be not only a camera but also an optical sensor such as a radar using infrared rays or millimeter waves or the like. A constitution using a single optical sensor instead of the pair of left and right optical sensors may be used. The camera and the radar may be used together. In the case of the radar, the arrangement of the lens of the camera in the above embodiments is an arrangement of an antenna. The support stay may be fixed to another part (main tube or the like) of the vehicle body frame, in addition to the head pipe of the vehicle body frame.

The saddled vehicles include any vehicle in which a driver straddles a vehicle body when riding it and include not only motorcycles (including bicycles with prime movers and a scooter type vehicles), but also three-wheeled (including two-front-wheel and one-rear-wheel vehicles in addition to one-front-wheel and two-rear-wheel vehicles) or four-wheeled vehicles.

Additionally, the constitution in the above-described embodiment is an example of the present invention, and various modifications such as replacing the elements of the embodiment with well-known elements are possible without departing from the gist of the present invention.

INDUSTRIAL APPLICABILITY

It is possible to provide an optical sensor supporting structure for a saddled vehicle capable of accurately detecting the front of the vehicle by the optical sensor without affecting the usability of accessories at the front of the vehicle.

BRIEF DESCRIPTION OF THE REFERENCE SYMBOLS 1, 101: Motorcycle (saddled vehicle)
2: Front wheel
3: Front fork
4b: Bottom bridge (bridge member)
5: Vehicle body frame
6: Head pipe
15: Front cowl assembly
21: Upper cowl portion (front cowl)
25: Headlight
31: Meter unit
35: Support stay
38, 138: Mount rail (rail portion)
41: Camera (optical sensor)
K1: Space

What is claim is:

1. An optical sensor supporting structure for a saddled vehicle, comprising:
 a pair of left and right optical sensors which are configured to detect an object in front of the vehicle; and
 a support stay which is fixed to a head pipe of a vehicle body frame and supports accessories at the front of the vehicle on the head pipe,
 wherein the pair of left and right optical sensors are supported by the support stay, and
 wherein the pair of left and right optical sensors are disposed below base ends of mirror stays.

2. The optical sensor supporting structure for a saddled vehicle according to claim 1, further comprising a pair of left and right front forks which pivotally support a front wheel, wherein the pair of left and right optical sensors are disposed on an outer side of the pair of left and right front forks in a width direction of the vehicle in a front view.

3. The optical sensor supporting structure for a saddled vehicle according to claim 1, further comprising:
 a pair of left and right front forks which pivotally support a front wheel; and
 a bridge member which connects a space between the pair of left and right front forks,
 wherein the pair of left and right optical sensors are disposed above the bridge member.

4. The optical sensor supporting structure for a saddled vehicle according to claim 1, wherein the support stay comprises a rail portion which fixes the pair of left and right optical sensors with a width direction of the vehicle being a lengthwise direction.

5. The optical sensor supporting structure for a saddled vehicle according to claim 1, wherein the pair of left and right optical sensors are rigidly mounted on the support stay.

6. The optical sensor supporting structure for a saddled vehicle according to claim 1, further comprising:
 a meter unit which is supported by the support stay; and
 a front cowl which covers a front of the meter unit,
 wherein the pair of left and right optical sensors are disposed in a space surrounded by the meter unit and the front cowl.

7. The optical sensor supporting structure for a saddled vehicle according to claim 1, wherein the pair of left and right optical sensors are supported by a mount rail extending between left and right arm portions of the support stay, and
 the mount rail is separated from left and right mirror fastening portions of the left and right arm portions of the support stay and coupled to the support stay.

* * * * *